US006577327B1

(12) United States Patent
Rochford et al.

(10) Patent No.: US 6,577,327 B1
(45) Date of Patent: Jun. 10, 2003

(54) SYSTEM, METHOD AND GRAPHICAL USER INTERFACE FOR BUILDING VIRTUAL PRIVATE NETWORKS

(75) Inventors: Suzanne L. Rochford, Hull (CA); David P Giles, Harlow (GB); Michele E. Morris, Great Dunmow (GB)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/396,452

(22) Filed: Sep. 15, 1999

(51) Int. Cl.[7] .................................. G09G 5/00
(52) U.S. Cl. ................. 345/735; 345/736; 709/223
(58) Field of Search ...................... 345/733–739, 345/965, 969; 709/220–229

(56) References Cited

U.S. PATENT DOCUMENTS

| | | | | |
|---|---|---|---|---|
| 5,394,522 A | * | 2/1995 | Sanchez-Frank et al. | 345/735 |
| 5,726,979 A | * | 3/1998 | Henderson et al. | 370/254 |
| 5,831,610 A | * | 11/1998 | Tonelli et al. | 345/735 |
| 5,838,907 A | * | 11/1998 | Hansen | 709/220 |
| 6,079,020 A | * | 6/2000 | Liu | 709/223 |
| 6,112,015 A | * | 8/2000 | Planas et al. | 345/735 |
| 6,225,999 B1 | * | 5/2001 | Jain et al. | 345/734 |
| 6,226,751 B1 | * | 5/2001 | Arrow et al. | 370/351 |

FOREIGN PATENT DOCUMENTS

WO    WO-00/60792    * 12/2000

* cited by examiner

*Primary Examiner*—Sy D. Luu

(57) ABSTRACT

High-level requirements specifying bandwidth, degree of featurization and quality of service are input to a network management system (NMS) in an elementary, high-level language. The NMS translates the set of high-level requirements into a set of low-level requirements using a first subroutine. A second subroutine then generates one or more options on the basis of the set of low-level requirements. Each option consists of a detailed technical specification for various elements of the underlying main network. In response to user selection of an option, the NMS converts the option to a set of graphical elements for display using a third subroutine. A cost breakdown is also provided for the selected option. The user may then commit the option to the NMS or reduce the high-level requirements if the cost is deemed too high. Subsequent to the selected option being committed, the NMS sends out the detailed technical specification to the appropriate network elements, resulting in the building of a VPN in accordance with the high level requirements. The high degree of automation enables faster service provisioning, less frequent errors and reduced training costs.

25 Claims, 15 Drawing Sheets

SYSTEM, METHOD AND GRAPHICAL USER INTERFACE FOR BUILDING VIRTUAL PRIVATE NETWORKS

FIELD OF THE INVENTION

The present invention is related to network management systems in general and, more particularly, to a system, processor-implemented method and graphical user interface for building virtual private networks.

BACKGROUND OF THE INVENTION

In order to enable geographically disparate sites such as branches of a bank or regional offices of a large corporation to communicate with one another, it is common for such organizations to create virtual private networks (VPNs), which lie on top of a public network infrastructure. The operator of the underlying public network, typically a telecommunications service provider (or "telco"), charges a fee for the set-up of a VPN, while the customer achieves end-to-end interconnectivity without having to worry about finding a path through the network, bandwidth usage patterns or equipment failures.

In greatly simplified terms, a VPN is typically built by following a four-phase process. The first phase is for the customer desirous of a VPN to specify a set of requirements in a high-level format. High-level data provided by the customer may include such information as the geographic location of customer sites and the number of telephones or video stations present or desired at each site. The second phase is for the telco staff to translate those high-level requirements into low-level requirements of a more technical nature, such as capacity and latency specifications.

The third phase involves the telco staff provisioning and configuring the underlying public network in order to meet the low-level requirements which have transpired from the previous phase. Finally, the fourth phase includes the telco charging the customer for the provisioning and configuration activities performed in the third phase.

Unfortunately, a major drawback with the conventional manner of creating a VPN is that the above-mentioned second phase (i.e., translating high-level requirements into low-level ones) requires that the telco train its technical staff until they attain a certain level of competency. This often takes weeks or months at a cost of thousands of dollars per employee. Furthermore, the third phase (configuring the underlying public network) may also disadvantageously take weeks or months to complete, especially if the customer wishes to be consulted when alternative options of configuring the network are available.

Moreover, command inputs entered into a network management system in the course of executing the third (provisioning) phase are typically entered by several people other than the individual who had interfaced with the customer during the first phase involving the specification of high-level requirements. The result is an increase in the telco's staffing costs and in the probability of a human error being committed in the course of building the VPN.

Clearly, there is a need in the industry to provide a utility which allows VPNs to be built faster, more reliably and in a more cost-effective manner.

SUMMARY OF THE INVENTION

The invention can be summarized as a method of setting up a VPN within a main network, which includes the steps of maintaining current configuration information on the main network, receiving high-level requirements to be met by the VPN and causing the main network to be automatically reconfigured to accommodate the high-level requirements. The main network may be the Internet or the public switched telephone network. The method may be implemented by a network management system (NMS) and may be stored as a set of instructions on a computer-readable storage medium.

Preferably, the method includes additional steps between the steps of receiving high-level requirements and causing the main network to be reconfigured. For instance, there is preferably an additional step of translating the set of high-level requirements into a set of low-level requirements, which is preferably followed by a step of generating at least one option for configuring the main network such that the set of low-level requirements is met.

Preferably, the user is presented with a selection mechanism by virtue of which a particular option may be selected. This is known as the "selected option". After an option is selected in this manner, the method preferably includes the additional step of graphically displaying a logical view of the main network configured in accordance with the selected option.

Preferably, the method includes the step of providing a graphical selection mechanism for allowing the user to choose between committing the selected option to the NMS or or modifying the selected option.

If the user chooses to modify the option, then the method preferably includes the steps of accepting user-generated reductions in the high-level requirements corresponding to the selected option, modifying the detailed technical specification corresponding to the selected option in accordance with said reductions, converting the modified detailed technical specification into a modified set of graphical elements; and displaying said set of modified graphical elements as a modified logical view of the main network.

The invention can also be summarized as a processor-implemented graphical user interface (GUI) method assisting a user in building a VPN. The GUI method includes providing a first interactive graphical mechanism for allowing the user to enter high-level requirements associated with each of a plurality of customer sites. The GUI method also includes providing a second interactive graphical mechanism for allowing the user to request the generation of at least one option for configuring a main network in accordance with said high-level requirements.

In response to a user input requesting the generation of at least one option, the GUI method includes providing a third interactive graphical mechanism for allowing the user to select one of the generated options. Next, in response to a user input selecting an option, the GUI method includes displaying a logical view of the VPN in accordance with the selected option.

Finally, the GUI method includes providing a fourth interactive graphical mechanism for allowing the user to commit the selected configuration option to a network management system.

By allowing a user to specify service requirements in an elementary language and then to select from a number of automatically generated and graphically displayed options for configuring the main network, the present invention eliminates the bulk of the time conventionally spent in building a VPN. Also, the resulting VPN-building procedure is more reliable and cheaper for the telecommunications service provider.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENT

Figure 14:
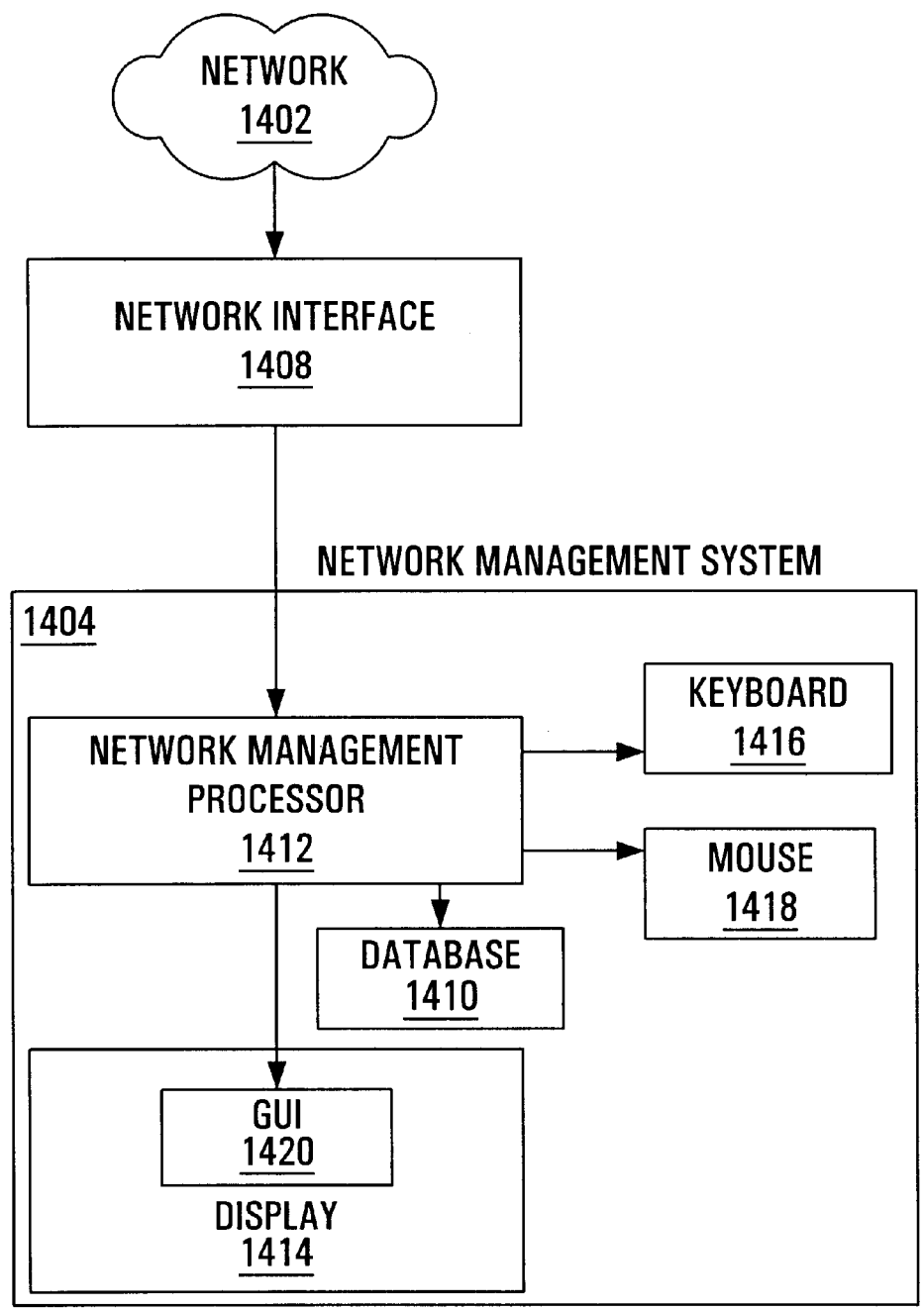
FIG. 14 illustrates in schematic form a main network, as well as a network management system for implementing the inventive method and GUI.

With reference to FIG. 14, there is shown in abstracted form a main network 1402 over top of which a customer may desire to establish a sub-network such as a virtual private network (VPN). For example, the main network 1402 may represent a public network, such as an Internet protocol (IP) driven network or the public switched telephone network (PSTN), through which various members of, say, a construction team may wish to communicate. In other cases, the main network 1402 may represent a proprietary network through which it is desirable to establish a VPN in order to securely link selected personnel in different departments of a large corporation.

Still in FIG. 14, a network management system (NMS) 1404 is shown connected to a network interface 1408, which is also connected to the main network 1402. The network interface 1408 is capable of collecting information, such as path availability data, from the main network 1402 and supplying control information, such as switch and router configurations, to the main network 1402. In addition, the network interface 1408 has access to suppliers and installers of equipment, possibly via telephone, Internet or another VPN. In this way, orders for equipment and/or its installation can be placed automatically from the network management system 1404.

The NMS 1404 has a database 1410 and a network management processor 1412 which is connected to a display 1414 and to various user input devices such as a keyboard 1416 and a mouse 1418. (If the display 1414 is touch sensitive, then the display itself provides a user input device.) The database 1410 contains all the information collected by the network interface 1408, including bandwidth availability between network elements, current routing and switching instructions being used by the various routers and switches in the network, and so on.

The NMS 1404 is used by telco staff who participate in the end-to-end provisioning of a type of sub-network commonly referred to as a virtual private network or VPN. The NMS 1404 is adapted to perform three main functions. Firstly, it presents a GUI 1420 on the display 1414 to enable the presentation of information to a user in a coherent manner and to enable the receipt of instructions from the user through the user input devices 1416, 1418. Secondly, it performs processing on the data stored in the database 1410 in accordance with instructions received from users through the GUI 1420 to put it into a form suitable for display. Thirdly, in response to further instructions received from users through the GUI 1420, it instructs the network interface 1408 to configure the main network 1402 according to data stored in the database 1410.

Figure 15:
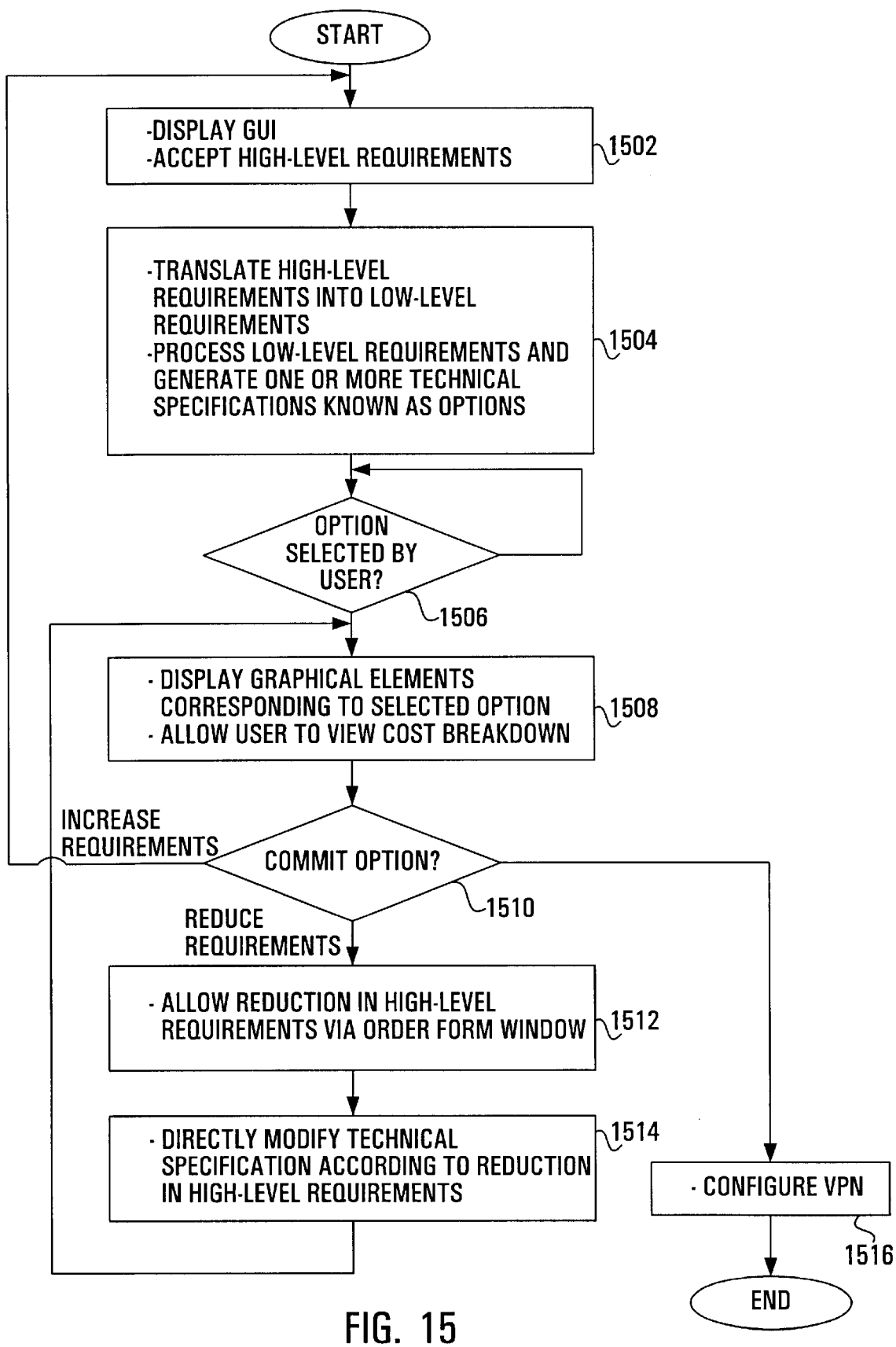
FIG. 15 is a flowchart showing operation of the inventive method.

Operation of the present invention is now described with reference to FIG. 15, wherein is shown a series of steps 1502–1516 in the VPN building process executed by the network management system 1404. These steps are now described in more detail with reference to FIGS. 1 to 13, in which are shown GUI displays at various phases of the VPN building process.

Step 1502

A GUI is presented on the display 1414 and allows the customer to enter high-level requirements specifying the desired VPN. The GUI may appear on a terminal before an operator employed by the telco. Alternatively, the customer may be able to log onto a terminal within the telco from a remote location via the World Wide Web, for example. The person interacting with the GUI will hereinafter be referred to simply as the "user".

Figure 1:
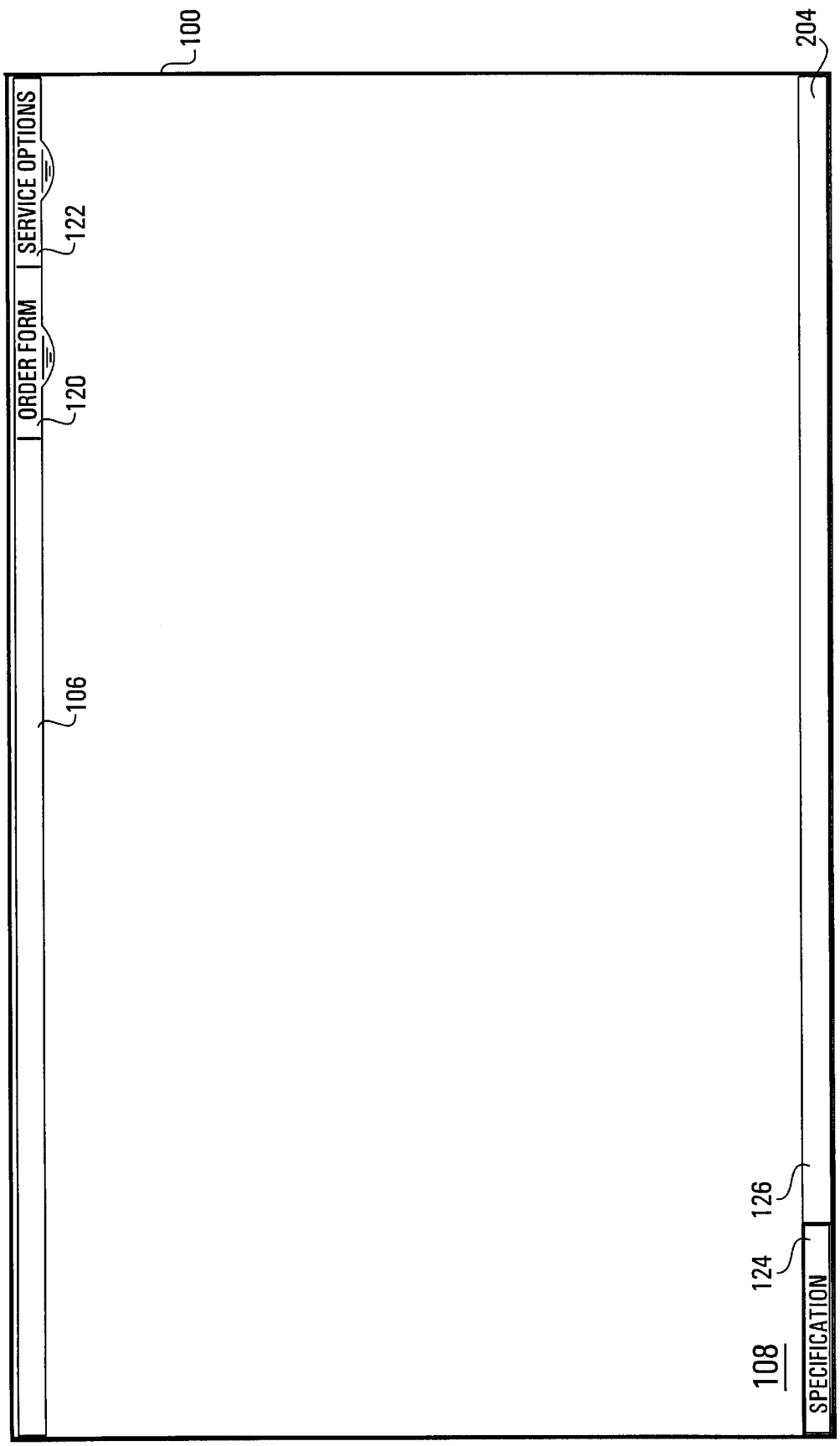
FIG. 1 illustrates a window presented on a network management system GUI, which allows a VPN to be built according to the preferred embodiment of the invention.

By way of example, FIG. 1 shows a main window 100 presented by the GUI 1420 on the display 1414. The main window 100 contains a working area 108, a display selector area 126 and a menu 106. Working area 108 serves as a canvas on which a user may graphically construct a VPN by positioning customer sites and specifying high-level requirements at each site. Working area 108 also serves to display a selected configuration option after such options are generated by the NMS 1404.

Display selector area 126 comprises a graphical selection mechanism which allows the user to choose what he or she wishes to see in working area 108. Since no configuration options have yet been generated by the NMS 1404, display selector area 126 in FIG. 1 shows only a SPECIFICATION tab 124 which, by default, presents a blank working area 108 in which the user may begin entering high-level requirements.

Menu 106 comprises graphical selection mechanisms 120, 122, which can take on any suitable form (e.g., tabs, palettes, menu items, buttons) and which, by way of example, are shown in FIG. 1 as an ORDER FORM palette 120 and a SERVICE OPTIONS palette 122. A particular selection mechanism can be activated in any standard way, e.g., by a combination of keystrokes on the keyboard or by pointing and clicking with a mouse or, if a touch-screen is used, by touching the region of the menu 106 occupied by the selection mechanism.

Figure 2:
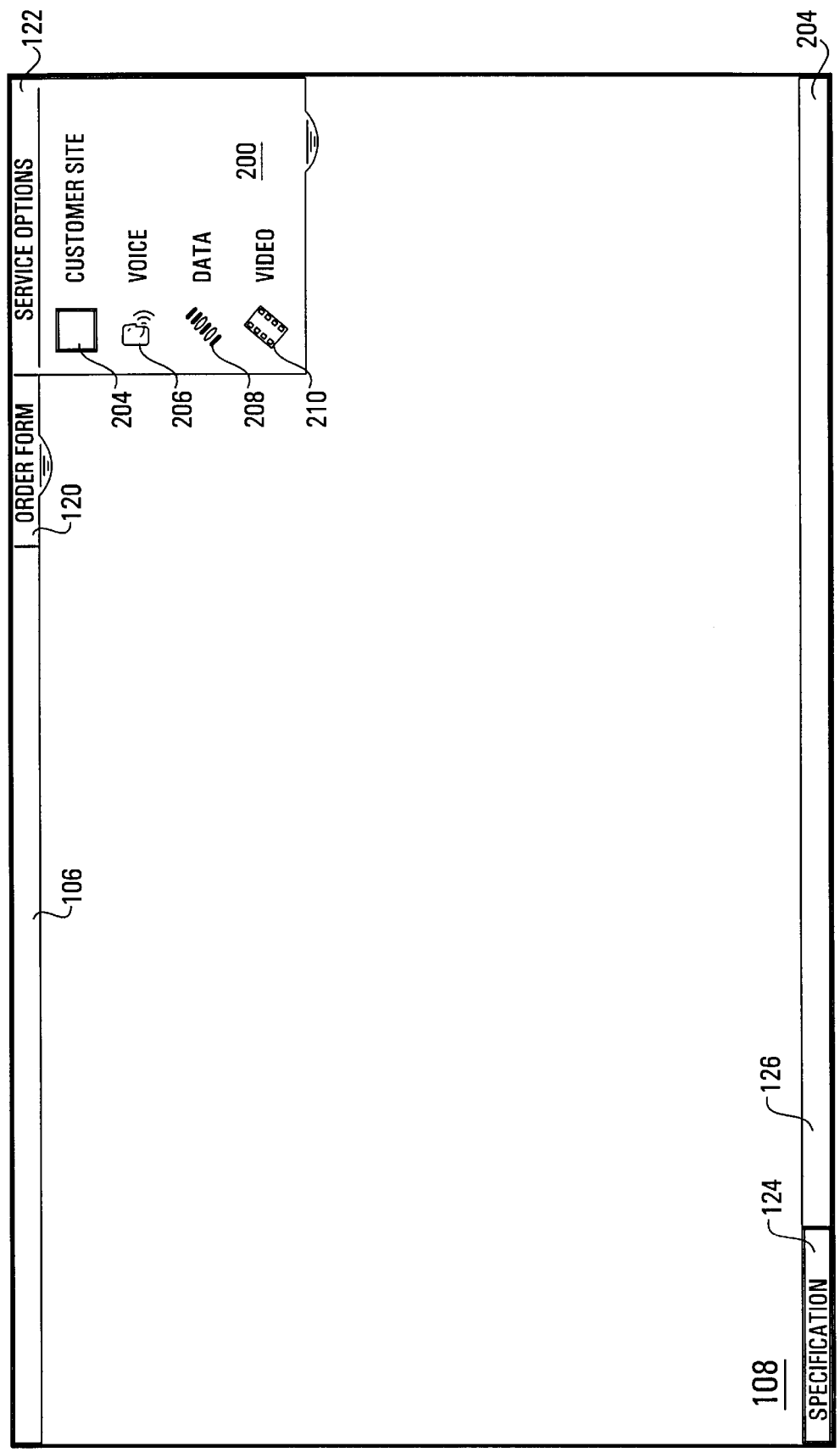
FIG. 2 illustrates a menu corresponding to a SERVICE OPTIONS palette shown in the window of FIG. 1.

High-level requirements can be entered by selecting the SERVICE OPTIONS palette 122 as is now described. FIG. 2 shows a service options window 200 which is caused to appear when the user selects the SERVICE OPTIONS palette 122. The service options window 200 presents a plurality of icons identifying various service types. In the illustrated example, the service options window 200 presents the user with drag-and-drop icons 204–210 including a CUSTOMER SITE icon 204, a VOICE icon 206, a DATA icon 208 and a VIDEO icon 210.

Each time the CUSTOMER SITE icon 204 is dragged to a location in working area 108, an information window (not shown) will preferably be caused to appear in the window 100. This information window will preferably comprise a plurality of fields which the user fills in with data about the customer site being positioned. The user may choose a representative name for that customer site and can type that name in a NAME field. In addition, the operator may fill a LOCATION field with other information (e.g., zip code, postal code, branch number, etc.) that provides the network management system with the location of the customer site. This assists the network management system in determining the nearest service provider and/or access site.

Figure 3:
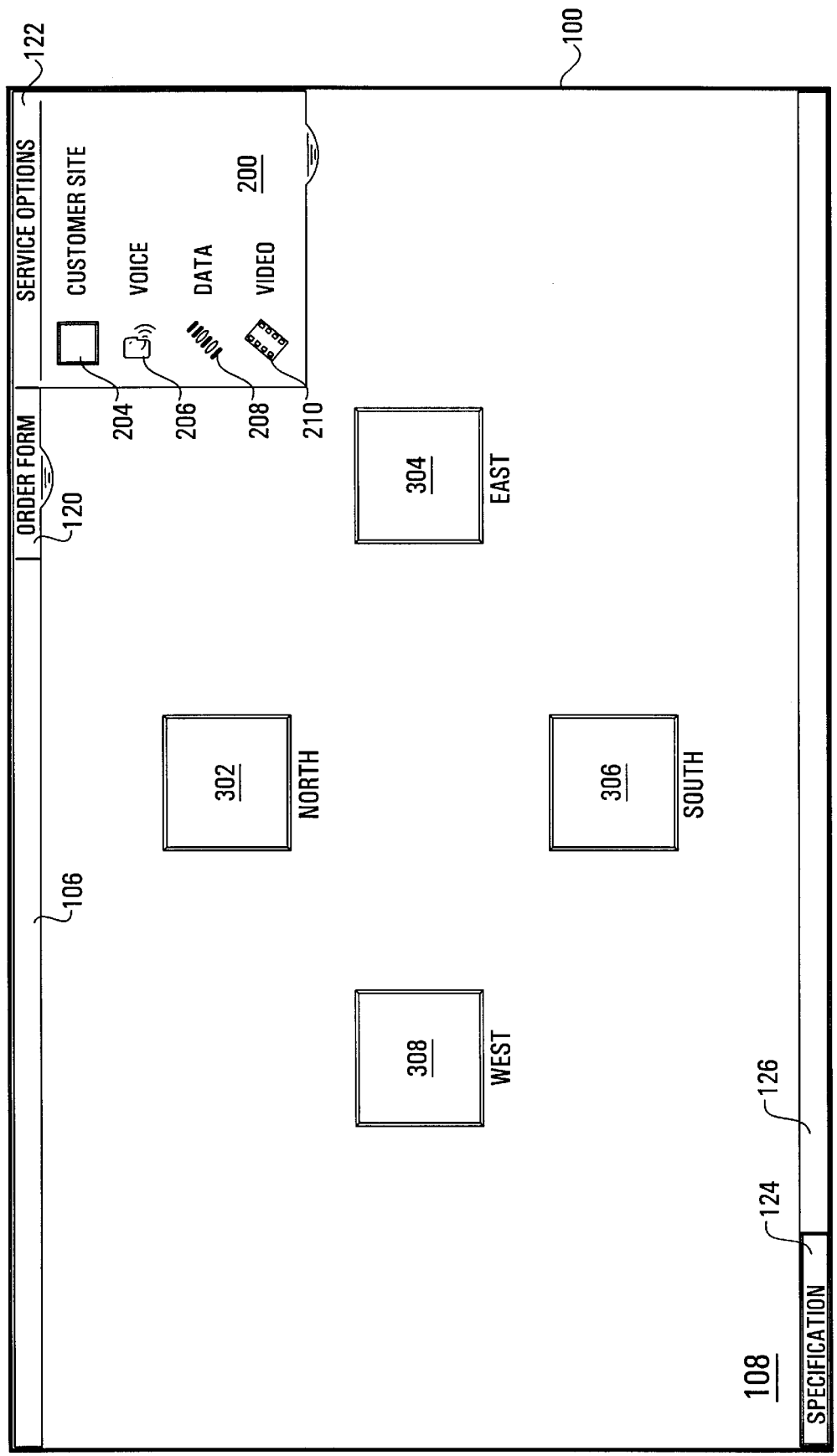
FIG. 3 illustrates customer sites positioned within a working area of the window of FIG. 1.

By repeatedly dragging the CUSTOMER SITE icon 204 to various parts of the working area 108, the user can construct an approximation to the physical distribution of the locations to be connected by a VPN. FIG. 3 shows the display resulting from having positioned four customer sites 302 (NORTH), 304 (EAST), 306 (SOUTH) and 308 (WEST) in working area 108 of window 100. The distribution of customer sites within the working area 108 need not be representative of the exact relative locations of the sites in the main (public) network, but may convey a more intuitive positioning of customer sites.

With continued reference to FIG. 3, each of the other icons (the VOICE icon 206, the DATA icon 208 and the VIDEO icon 210 and possibly others) in the SERVICE OPTIONS window 200 can be dragged and dropped onto a previously positioned customer site 302, 304, 306, 308 in working area 108. The dragging and dropping of one of these icons onto a particular customer site signifies that the corresponding type of service is desired at that site.

Figure 4:
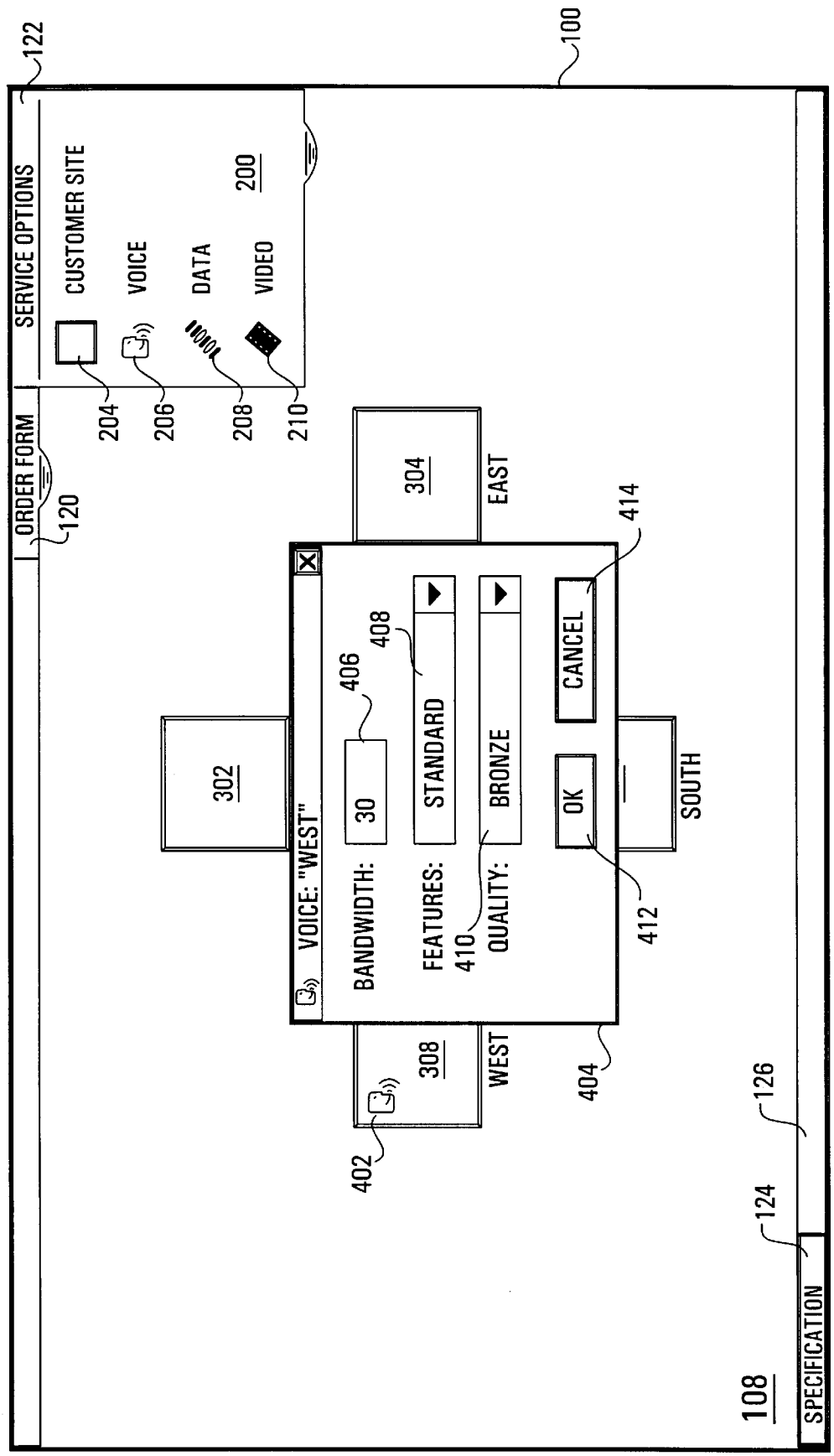
FIG. 4 illustrates a requirements form associated with a particular service type and customer site.
Figure 5:
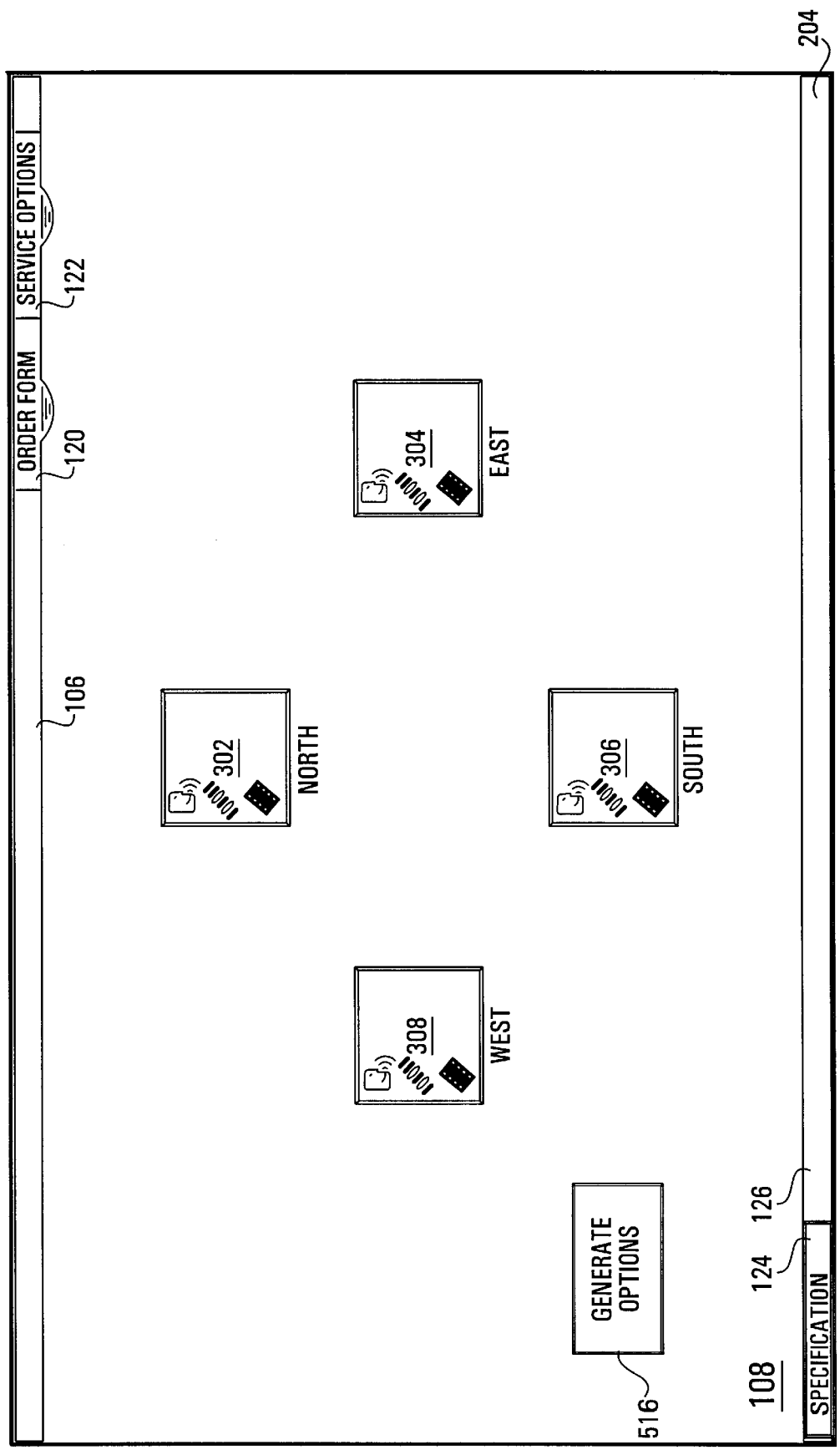
FIG. 5 illustrates selection of a GENERATE OPTIONS button in the working area of the window of FIG. 1.

By way of example, FIG. 4 shows the GUI display resulting from a VOICE icon 402 having been dragged and dropped onto the WEST site 308. A requirements form (or specification area) 404 is then caused to appear in working area 108. The requirements form 404 preferably comprises a plurality of fields through which the user enters high-level requirements, in this case associated with voice services at the WEST site 308.

Suitable fields contained in the requirements form include a BANDWIDTH field 406, a FEATURES field 408, a QUALITY field 410 and others (e.g., voice-mail, e-mail) which are not shown in FIG. 4 Some fields may be binary and could be represented by a circle that is either filled or unfilled. Other fields necessitate the user to type in a value or choose from a list of possibilities.

The bandwidth requirement for voice services can be specified in terms of the number of telephone lines needed at that site and is entered in the BANDWIDTH field 406. Information such as the number and type of features (e.g., call waiting) that are desired is entered in the FEATURES field 408 and may range from basic to standard to fully featurized, for example. Furthermore, the QUALITY field 410 is filled by selecting from a group consisting of high-level grades of service, e.g., "gold", "silver" and "bronze".

It is to be appreciated that requirements forms similar to requirements form 404 appear when icons corresponding to different services are dragged and subsequently dropped onto the WEST site 308 and other customer sites. However, not all service types will necessarily have the same choices for bandwidth, degree of featurization, quality of service, etc.

For instance, in the case of video, the quality might not be permitted to be less than "gold". Also in the case of video services, the bandwidth may be specifiable as the number of video-conference terminals (stations), while in the case of data services it may correspond to the number of computers equipped with modems. Nevertheless, in all cases the choices provided by the fields (e.g., fields 406, 408, 410) in each requirements form 404 remain at a high level of abstraction and preferably use an elementary language familiar to the customer.

Once the customer is satisfied with the entries in the fields (e.g., the BANDWIDTH, FEATURES and QUALITY fields 406, 408, 410) on the requirements form 404, the user can interact with the GUI 1420 by accessing an entry mechanism (such as an OK button 412) or a cancellation mechanism (such as a CANCEL button 414). In the example shown in FIG. 4, pressing the OK button 412 causes the data in the various fields of the requirements form 404 to be sent to the NMS 1404 for storage in the database 1410, while pressing the CANCEL button 414 removes the most recently placed icon (in this case, VOICE icon 402 on WEST site 308) from the display 1414 and returns the display to the situation illustrated in FIG. 3.

Step 1504

Once the user has entered all requirements at a high level, the user can choose to build a VPN. Firstly, the user can cause the set of high-level requirements to be translated into a set of low-level requirements by a first software subroutine. The low-level requirements are then processed by a second software subroutine which generates one or more technical specifications for configuring the underlying network. Each such technical specification is known as a configuration option or simply an "option".

By way of example, as soon as working area 108 contains at least two customer sites having at least one associated service type per site, it is possible to create a VPN over top of the underlying main network. To this end, and with reference to FIG. 5, a GENERATE OPTIONS button 516 is caused to appear in working area 108. Translation of the high-level requirements into low-level requirements and processing of the low-level requirements into one or more options is triggered by the user selecting the GENERATE OPTIONS button 516.

(Another window (not shown) may be caused to appear after the GENERATE OPTIONS button 516 is pressed, prompting the user to specify an upper bound on the number of configuration options that are to be generated, in the event that more than one option can be generated.)

As a consequence of the GENERATE OPTIONS button 516 having been pressed, the NMS 1404 calls the first subroutine for. translating the high-level user requirements (such as bandwidth, featurization and quality of service at each customer site, as stored in the database 1410) into a set of low-level requirements. The low-level requirements are of a more technical nature and may include such parameters as the number of T1 lines required per site, the maximum tolerable delay between customer sites, etc. While the conventional way of translating high-level requirements into low-level requirements is to perform this translation manually, the present invention allows for automatic translation through a one-touch process via the GENERATE OPTIONS button 516.

The second subroutine processes the low-level requirements obtained from the first subroutine and produces at least one configuration option (and up to the maximum specified number thereof). Specifically, the network management system 1404 processes the set of low-level requirements in conjunction with the network information contained in the database 1410 in order to determine a list of terminating equipment, transport equipment, switching equipment as well as a set of switching instructions for configuring the switching equipment which will allow the low-level requirements to be satisfied. The NMS 1404 also consults the database 1410 in order to determine the cost structure for each configuration option, as well as an expected readiness date.

It is noted that while most of the hardware required to meet the low-level requirements may already exist in the underlying network, it may happen that additional hardware needs to be installed. Also, for the same set of low-level requirements generated by the first subroutine, some options generated by the second subroutine may require the installation of additional hardware while others may not.

Execution of the first (translation) and second (options-generating) subroutines may involve a large number of computational operations and hence an amount of time on the order of seconds may elapse before these subroutines have finished and all the configuration options have been generated. The GUI may therefore provide an indication of each subroutine's progress in the form of a progress window.

Figure 6:
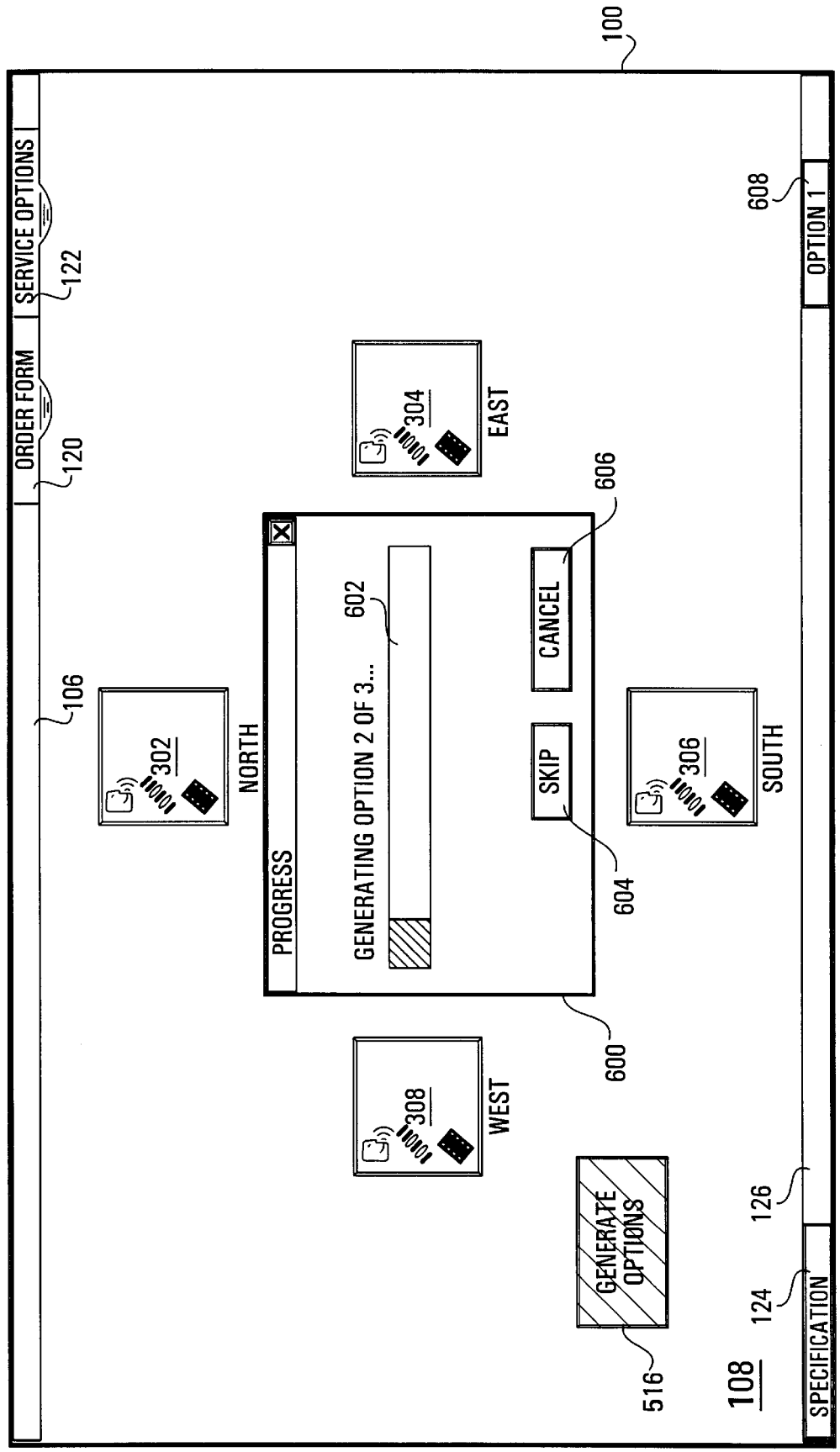
FIG. 6 illustrates a progress bar for display in the working area of the window of FIG. 1 during generation of configuration options.

For example, FIG. 6 shows a progress window 600 which can be displayed in working area 108 while configuration options are being generated by the second subroutine. The progress window 600 preferably comprises a progress bar 602 which displays the number of the configuration option currently being generated (in this case, configuration option #2). The progress bar 602 may be progressively darkened, giving the user the impression that the progress bar 602 is "filling up". Alternatively, an icon such as an hourglass may be displayed to indicate that the NMS 1404 is busy with the generation of configuration options.

The progress window 600 associated with the second (options-generating) subroutine may also comprise a SKIP button 604 and a CANCEL button 606. The SKIP button 604 may be pressed to instruct the NMS 1404 to cancel generation of the current configuration option and to begin generating the next configuration option (if applicable). The CANCEL button 606 can be used for cancelling the generation of all configuration options, including those which may already have been generated.

As each configuration option is generated using the second subroutine, a selection mechanism (such as a tab similar to the SPECIFICATION tab 124 but identifying the configuration option by number or by total cost) appears in the window 100, preferably in the display selector area 126. Alternatively, a listing of configuration options could be provided to the user via a menu.

Figure 7:
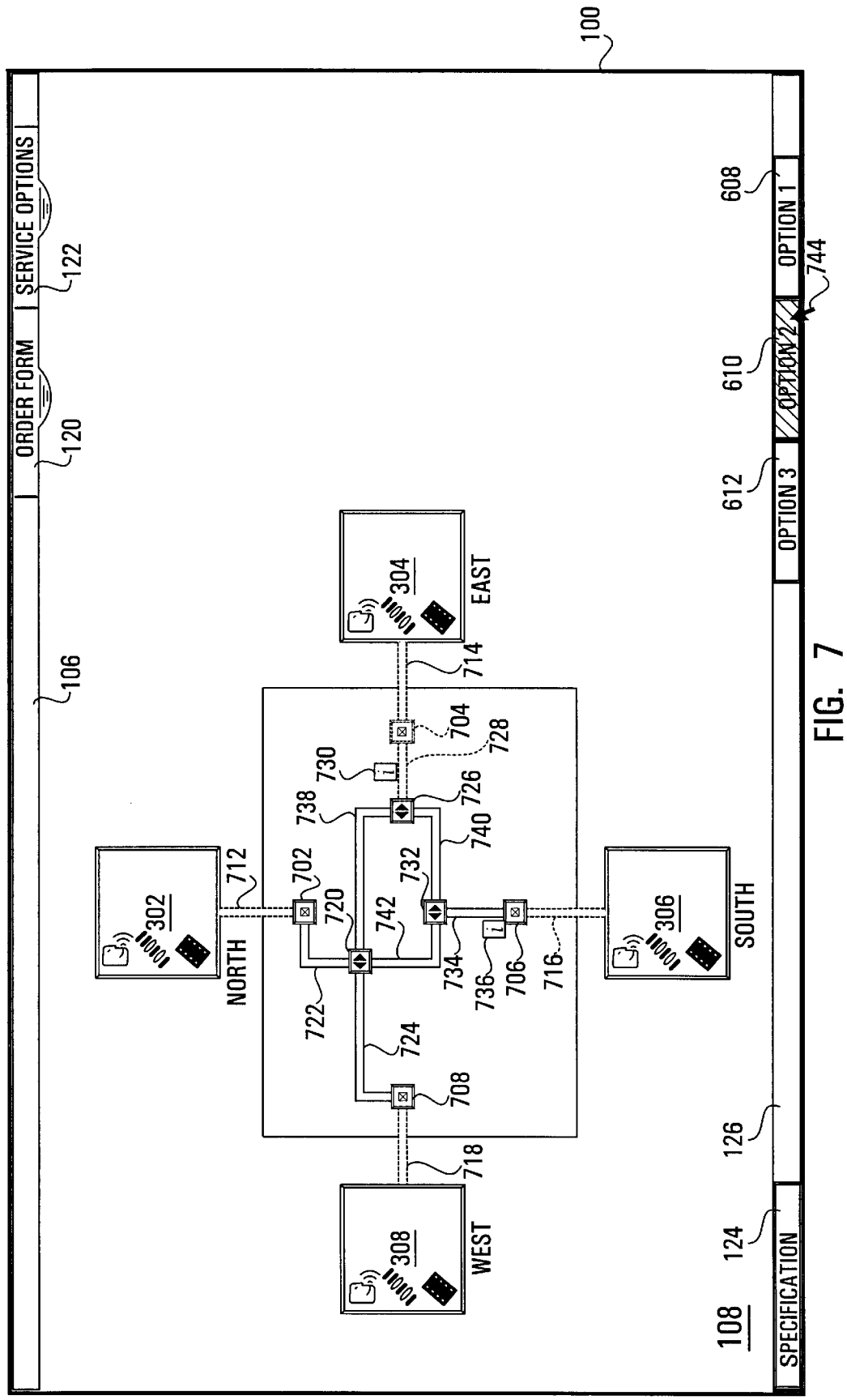
FIG. 7 illustrates a diagram corresponding to a feasible configuration option and displayed in the working area of the window of FIG. 1.

By way of example, let it be assumed that the maximum number of potential network configurations is three and that the SKIP button 604 in the progress window 600 has not been depressed while the second subroutine was in progress. FIG. 7 shows a plurality of tabs 608, 610 and 612, each corresponding to one of three configuration options.

Step 1506

The NMS 1404 then awaits user selection of one of the options via the appropriate selection mechanism, in this case represented by tabs 608, 610 and 612.

Step 1508

In response to the user selecting a particular configuration option, the NMS 1404 runs a third software subroutine for converting the associated detailed technical specification into a set of high-level graphical elements. Preferably, a symbol dictionary is used to convert low-level technical data into graphical elements. A suitable symbol dictionary is described in U.S. patent application Ser. No. 08/764,086 (Planas et al.), filed Dec. 6, 1996, assigned to the assignee of the present invention and incorporated by reference herein.

After an option is selected at step 1506, the displayed graphical elements preferably include the customer sites as originally placed in STEP 1502, along with their corresponding service icons (e.g., voice, video, data). In addition, icons representing the interconnections among these elements are displayed. If the symbols used to represent interconnections require more space between customer sites than would be available from the initial positioning of customer sites by the user (in STEP 1502), there may be a slight redistribution of the customer sites within working area 108.

With reference now to FIG. 7, it is seen that the configuration option #2, accessible by pressing tab 610, has been selected. The associated set of graphical elements resulting from the conversion performed by the third subroutine in the NMS 1404 is displayed in working area 108. In this particular example, there is illustrated a plurality of access nodes 702, 704, 706, 708 respectively connected to customer sites 302, 304, 306, 308 by a respective plurality of links 712, 714, 716, 718.

According to the particular characteristics of the underlying main network in the present example, customer sites 302, 304, 306, 308 currently do not have access to bandwidth pipes within the main network. This is indicated by having presented links 712, 714, 716, 718 in dotted outline, although other visual characteristics could be used. Also in this specific case, access node 704 does not yet belong to the main network infrastructure and therefore appears in dotted outline.

Access nodes 702, 708 are shown as being connected to an existing core or backbone network element 720 via links 722, 24, respectively. In addition, access node 704 is connected to n existing core or backbone network element 726 via an as yet on-existent link 728 (shown in dotted outline) and access node 706 is connected to an existing core or backbone network element 732 via a link 734. Links 738, 740, 742 connect the NSP network element 720, 726, 732 in a ring-link structure.

In many cases, the technical specification corresponding to a selected option will partly involve the configuration of existing switches. However, it is also possible that additional hardware will need to be installed. The GUI 1420 preferably provides feedback to the user as to whether the selected option is implementable immediately or whether additional hardware must first be installed.

In the illustrated example, the fact that access node 704 and link 728 require the installation of additional hardware is reflected by a "hardware installation" icon 730 placed proximate access node 704 and link 728. Moreover, although the solid outline of link 734 indicates that link 734 already exists, an "hardware installation" icon 736 nevertheless appears next to link 734 to indicate that additional capacity must be installed. Preferably, the result of clicking on one of the "hardware installation" icons 730, 736 is the appearance of a window (not shown) which provides further information about the type of equipment installation required.

Other sets of graphical elements corresponding to other configuration options may be viewed by clicking on the appropriate tab in the display selector area 126. Each such configuration option represents an alternative configuration of the main network which meets the customer requirements specified at STEP 1502. As the options are graphically presented in simplified form, at a substantially high level of abstraction, the user may easily choose a particular option in order to explore the properties of each option in further detail. For example, by clicking on a particular link or customer site or icon, more detailed information regarding the link or site or icon is made available to the user.

Figure 8:
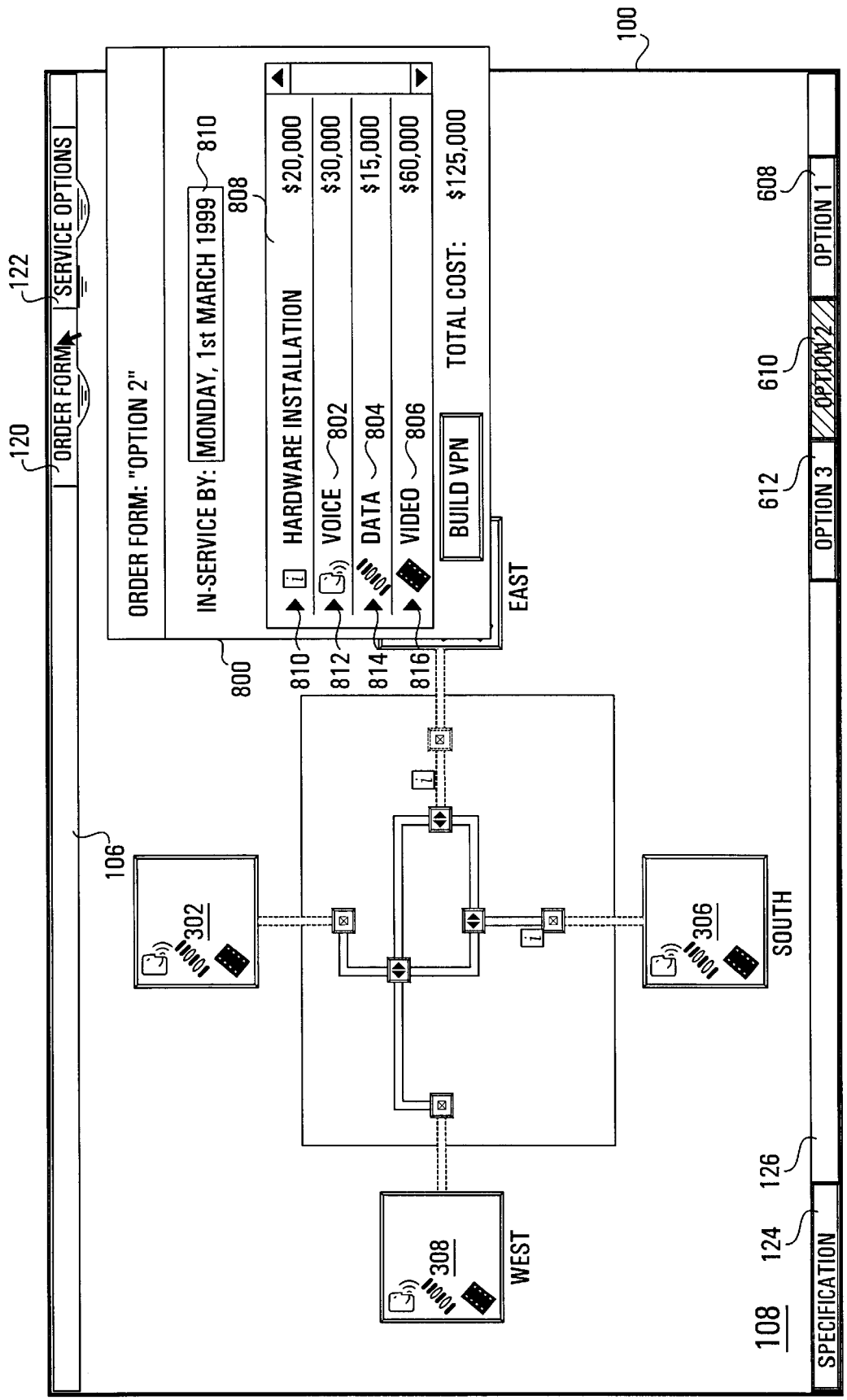
FIG. 8 illustrates an order form window displayed in the working area of the window of FIG. 1.

In addition, the GUI 1420 allows the user to view a cost breakdown of the selected configuration option. In the illustrated example, such access is provided via the ORDER FORM palette 120 in menu 106. With reference to FIG. 8, an order form window 800 appears within working area 108 subsequent to selection of the order form palette in menu 106. The order form window 800 can be moved to another part of the screen 102 in order to facilitate viewing the set of graphical elements in working area 108 at the same time as the cost breakdown in the order form window 800.

The order form window 800 is arranged to provide an indication of the cost of the high-level requirements being satisfied by the selected option. The order form window 800 is preferably organized in tabular form according to a combination of a site key (e.g., name of customer site), a requirements key (e.g., services provided at a given site) and/or a cost key (e.g., cost of a given service at a particular site).

In the illustrated example of FIG. 8, the order form window 800 is arranged on a per-service basis (the requirements key) and accordingly has a VOICE field 802, a DATA field 804 and a VIDEO field 806. Within each field is shown the total cost for the respective service across all customer sites. For example, in FIG. 8, the total cost of voice services is shown as being $30,000.

Furthermore, the order form window 800 preferably contains an indication of the cost of installing new equipment. In the illustrated example, this is conveyed by the presence of a HARDWARE INSTALLATION field 808. The cost of hardware installation associated with the selected configuration option is displayed next to the HARDWARE INSTALLATION field 808. In this case, the total cost of hardware installation is shown as being $20,000.

Additionally, the total cost of the selected configuration option is also provided in the order form window 800. The total cost is calculated as the sum of the overall cost of each service, in addition to the cost of hardware installation. In FIG. 8, the total cost is shown as being $125,000. If the information in the order form window 800 is keyed according to customer site, then the total cost would be calculated as the sum of the cost associated with each site, in addition to the cost of hardware installation which would, of course, lead to the same total amount.

Preferably, the order form window 800 also comprises a DATE field 810, which indicates the readiness date determined by the above described options-generating subroutine for each configuration option. In the example of FIG. 8, the readiness date in the DATE field 810 is shown as Monday, $1^{st}$ March, 1999.

Figure 9:
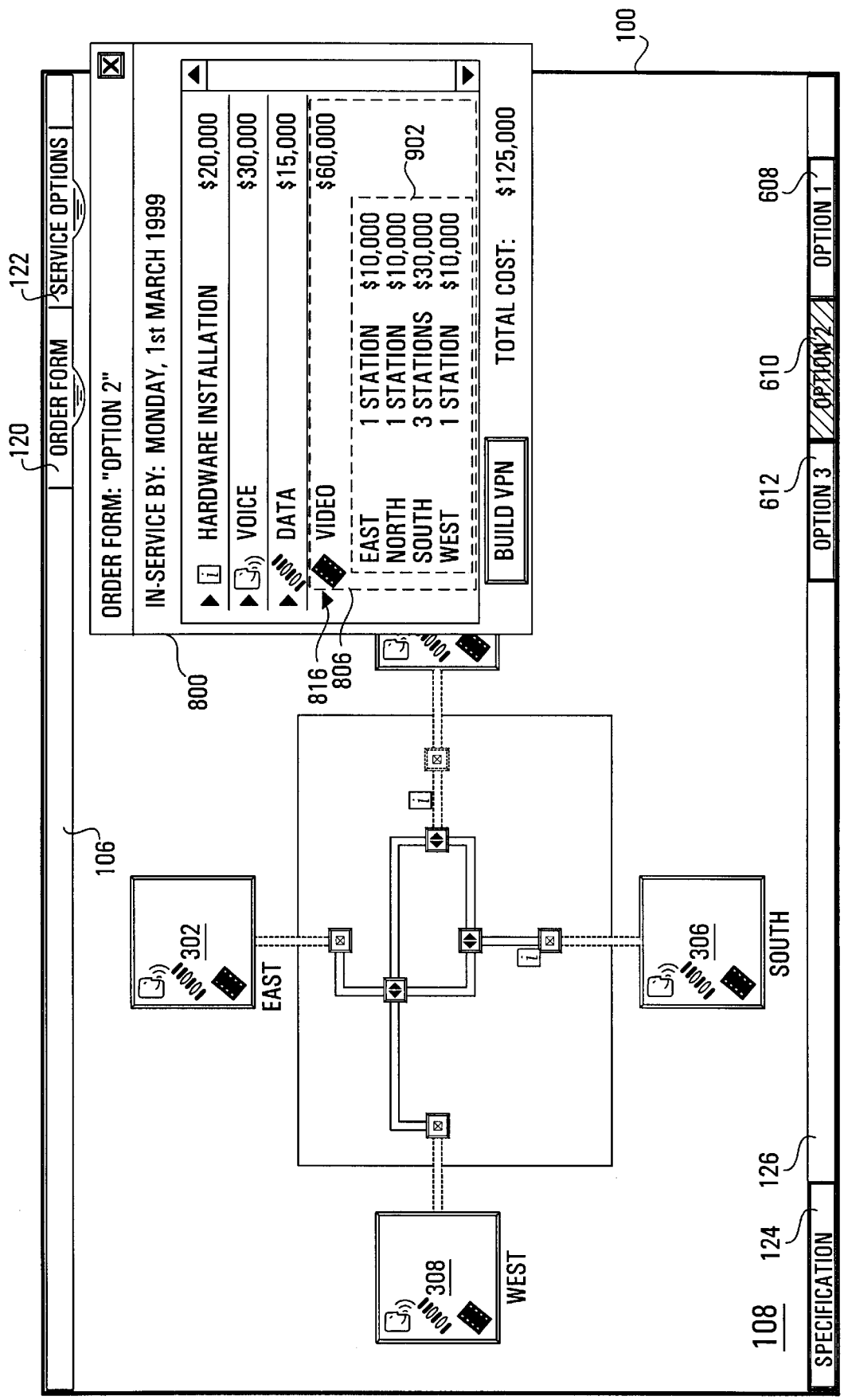
FIG. 9 illustrates an expanded video field in the order form window of FIG. 8.

By clicking on an expander button adjacent a field (for example, expander buttons 812, 814, 816, 818 adjacent fields 802, 804, 806, 808, respectively), the GUI 1420 displays a more detailed cost breakdown associated with the respective field. With reference to FIG. 9, for example, the VIDEO field 806 has been expanded to reveal an expanded cost table 902 broken down on a per-site basis. (Note that if the fields in the order form window 800 are organized on a per-site basis, then expansion of a particular field could reveal an expanded cost table organized on a per-service-type basis.)

Each expanded field in the expanded cost table 902 could be further broken down to reveal the cost of each initially specified high-level requirement, such as bandwidth, featurization, quality of service, etc. For example, each row in the expanded table 902 shows the number of video stations initially specified by the customer. Other columns could be added to reveal the featurization or quality of service for each video station and therefore it is within the scope of the invention to provide suitable mechanisms for adequately expanding each field in the order form window 800.

Step 1510

Upon analyzing the cost breakdown shown in the order form window 800, the user may wish to commit the selected option to the NMS 1404 or may wish to modify certain elements of the cost structure by reducing the high-level requirements. If the user is satisfied with the cost breakdown, then STEP 1516 (to be described later) may be entered by selecting a BUILD VPN button 1202 in the order form window 800. Otherwise, the user can choose to reduce the high-level requirements (at STEP 1512) or regenerate a set of options from an entirely different set of high-level requirements (STEP 1502 accessible via the SPECIFICATION tab 124).

Step 1512

The user is permitted to change certain parameters of the selected configuration option via the order form window 800.

Specifically, what is enabled is a reduction in the high-level requirements without having to regenerate the option. The high-level requirements may be accessed directly through the order form window 800 (which, when expanded, can provide the user with information on all high-level requirements met by each site).

Figure 10:
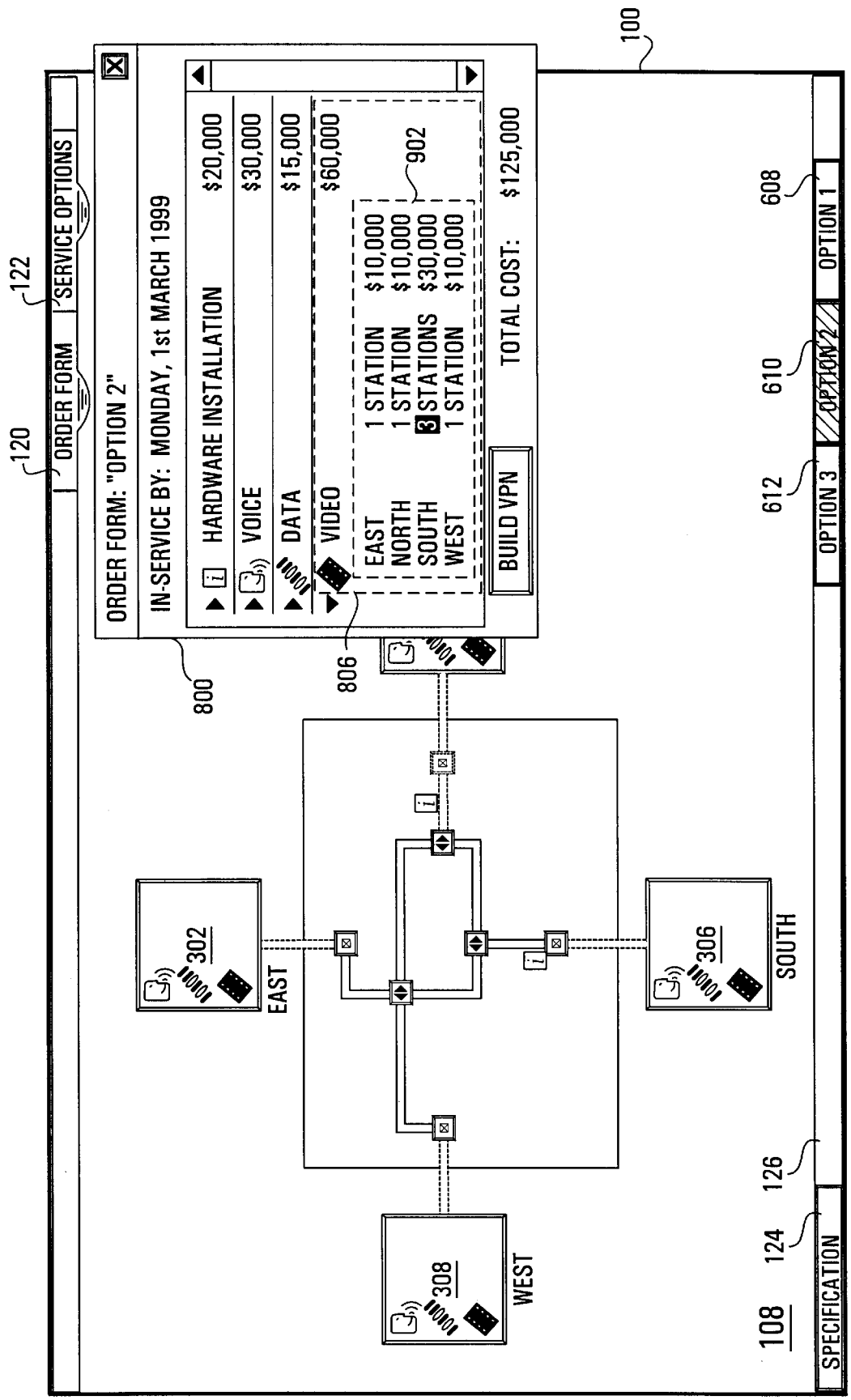
FIG. 10 illustrates writability of the expanded video field of FIG. 9.

For example, with reference to the expanded cost table 902 shown in FIG. 10, the number of video stations at the SOUTH site 306 (i.e., the "bandwidth requirement) has been highlighted and currently has a value of "3". The user may decide that the cost of configuration option #2 is too high and may wish to reduce the cost by reducing the number of video stations at the SOUTH site 306 to unity. According to the preferred embodiment of the present invention, the user is permitted to effect the desired change via the order form 800. Alternatively, the user can access the same information and effect the same change by clicking on the SOUTH site 306.

Step 1514

After a change has been made to the selected configuration option in the manner described with reference to STEP 1512, the NMS 1404 runs a fourth subroutine. This fourth subroutine processes the updated high-level requirements in view of the technical specification corresponding to the selected option. Since only a reduction to the high-level requirements, the fourth subroutine produces an updated technical specification which is a subset of the original technical specification corresponding to the selected option.

Figure 11:
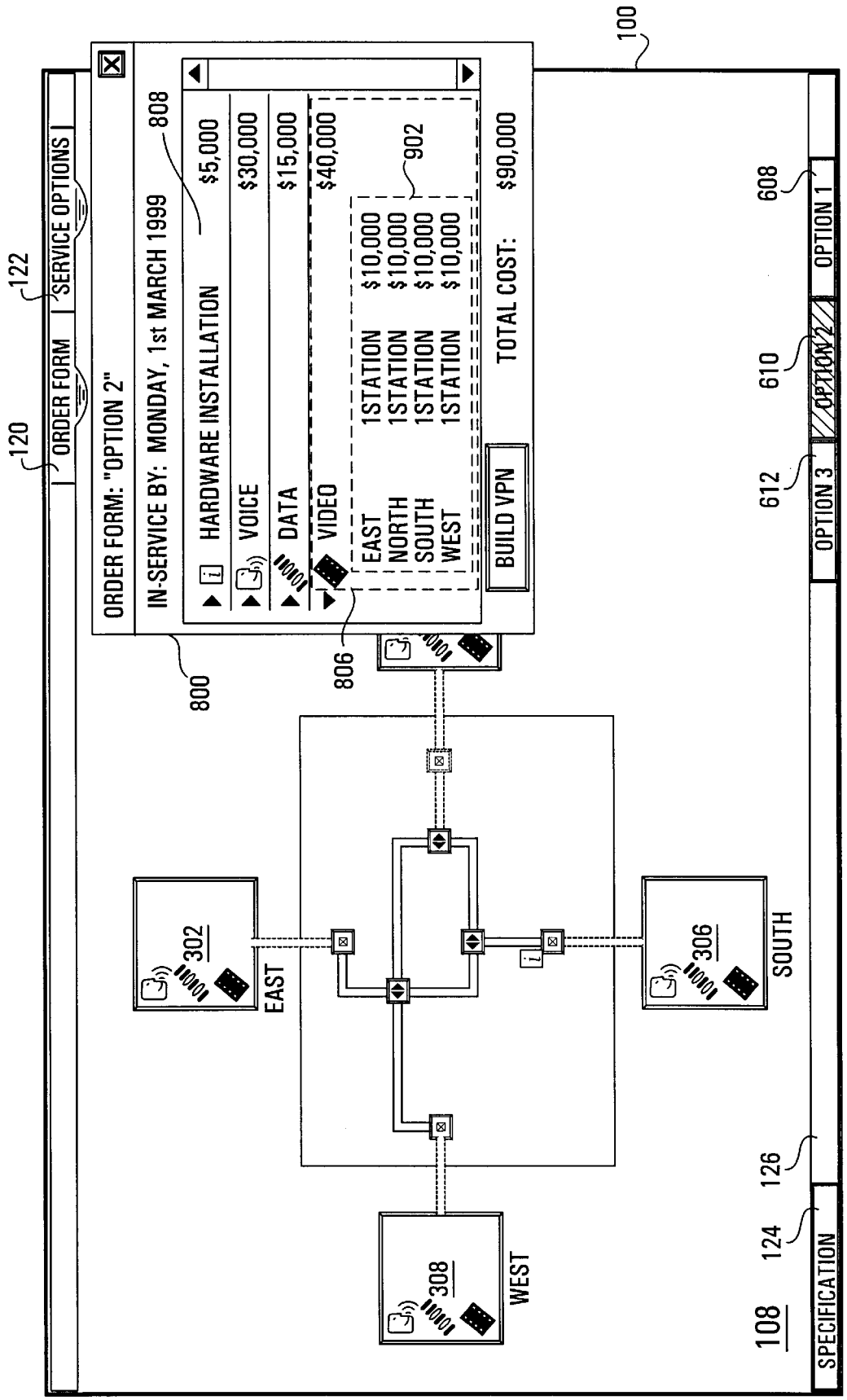
FIG. 11 illustrates the effect of changing the value of an element in the expanded video field of FIG. 9.

Armed with an updated technical specification, the NMS 1404 returns to STEP 1508, where an updated set of graphical elements is displayed. A new cost estimate and readiness date may be generated, and the HARDWARE INSTALLATION field 808 may be changed as a result of the new, less stringent requirements. With reference to FIG. 11, it is noted that as a result of having reduced the number of video stations at the SOUTH site 306, one of the hardware installation icons (formerly icon 730 in FIG. 7) has disappeared from working area 108 and the cost associated with the HARDWARE INSTALLATION field 808 has been reduced to $5,000. The readiness date has remained unchanged.

Modification of the customer requirements directly by changing the value of an element in the order form window 800 is most useful for fine-tuning purposes once a generally satisfactory configuration option has been identified. Such modifications are primarily aimed at reducing the cost of the option by reducing high-level service requirements. If it is desired to add more capacity, or if the reductions in capacity are expected to result in an entirely different network configuration or cost structure, then the user should return to the initial phase of entering high-level requirements (STEP 1502) by, for example, pressing the SPECIFICATION tab 124.

After having executing STEP 1514 and re-executing STEP 1508, the NMS 1404 re-executes STEP 1510, at which point the user is again allowed to further reduce (i.e., to further reduce) the high-level requirements (STEP 1512) or to commit the selected and stripped down option to the NMS (STEP 1516).

Step 1516

Figure 12:
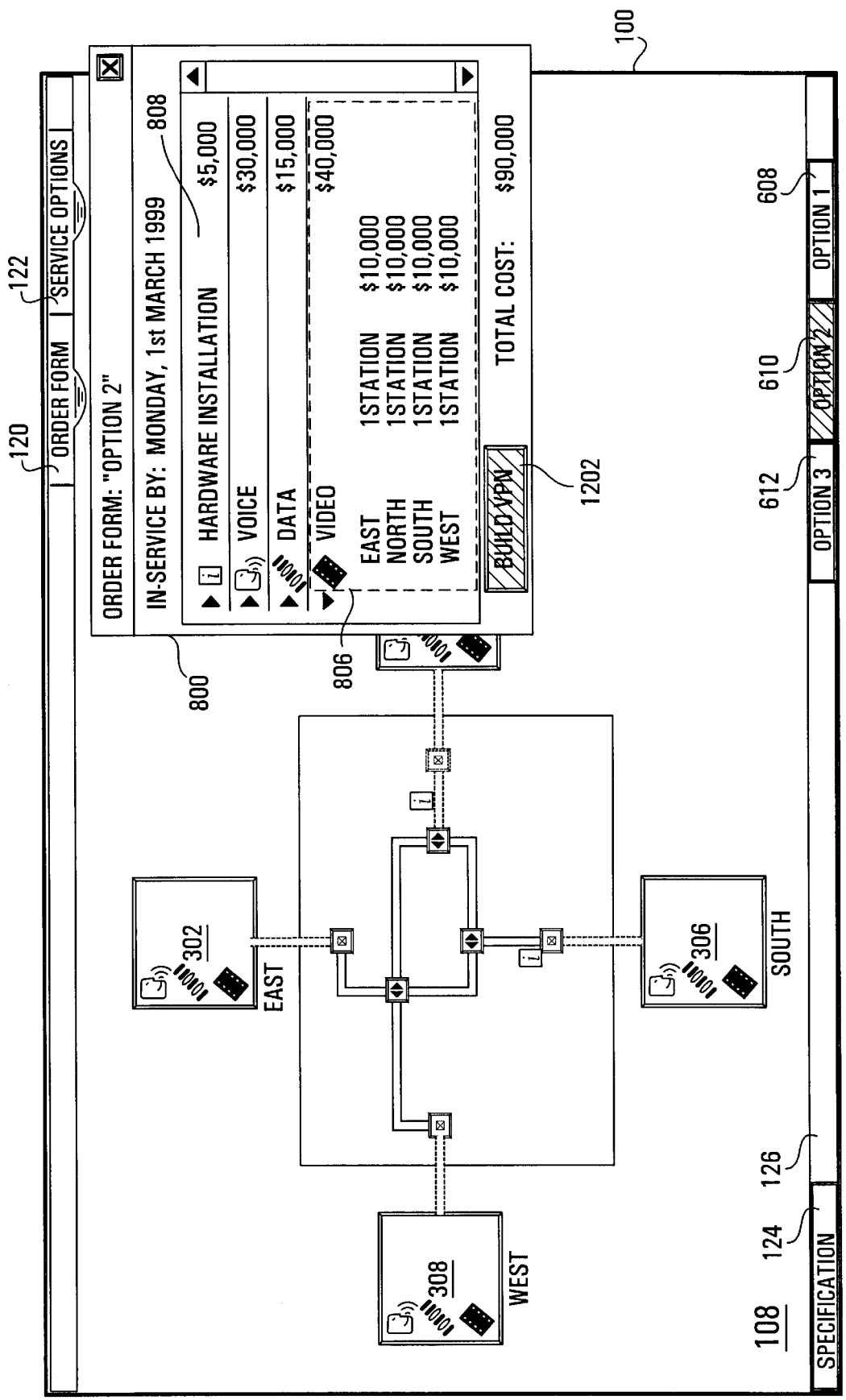
FIG. 12 illustrates selection of a BUILD VPN button on the order form window of FIG. 8.

Once a satisfactory configuration option has been identified and fine-tuned, the next and final step is to cause the virtual private network to be provisioned and connected. To this end, a graphical VPN-building mechanism is preferably provided in the order form window 800. With reference to FIG. 12, the VPN-building mechanism is provided by a BUILD VPN button 1202 in the order form window 800. Alternatively, there may be provided a separate BUILD VPN button in the menu 106 or in working area 108.

Once the user selects the BUILD VPN button 1202 (shown in FIG. 12 as cross-hatched when selected), the selected and possibly fine-tuned configuration option is "committed" to the NMS 1404. The NMS 1404 is then responsible for provisioning the VPN, ordering equipment and scheduling its installation. The NMS 1404 also sends routing tables to various routers in the main network 1402. Furthermore, a listing of the amount and location of new hardware which needs to be installed may be transmitted by electronic mail to suppliers and installers or may appear in a shared electronic purchase order system. In addition, an invoice may be forwarded by electronic mail to the customer. Automated systems located within the routers and at the suppliers' or installers' sites subsequently handle provisioning of the VPN, processing of equipment orders and that scheduling of installation.

Figure 13:
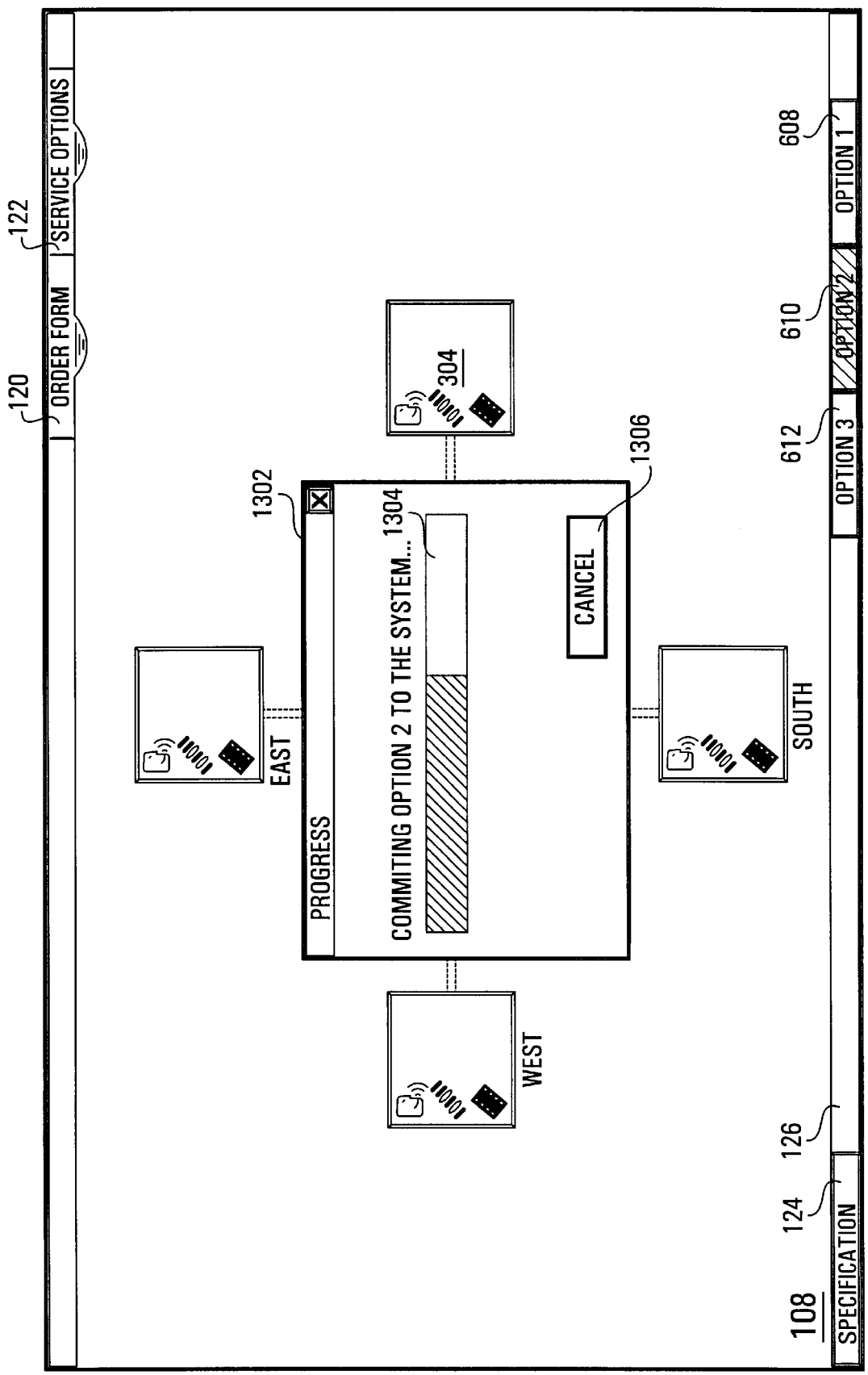
FIG. 13 illustrates a progress bar for display in the working area of the window of FIG. 1 after fine-tuning a selected configuration option.

With reference now to FIG. 13, there is shown a progress window 1302 which is preferably displayed by the graphical user interface 1420 during the time when the selected (and possibly fine-tuned) configuration option is being committed to the NMS 1404. The progress window 1302 may comprise a progress bar 1304 and a CANCEL button 1306. The progress bar 1304 may be gradually darkened from one end to the other as the process of committing the option carries on. A cancellation mechanism, such as a CANCEL button 1306, allows the user to stop the option from being committed to the NMS 1404.

After the main network 1402 has been configured according to the selected (and possibly modified) configuration option, the database 1410 in the network management system 1404 will be updated to reflect the resulting new routing and switching tables, new bandwidth availability information, and so on. This update can be performed as a direct result of the user committing the selected option to the network management system or subsequent to such information being collected by the network interface 1408.

By using the GUI 1420 and the NMS 1404 to implement the above described steps in setting up a VPN, there advantageously results faster service provisioning and less frequent errors. Furthermore, due to the high level of automation involved in the set-up of the VPN, the telco benefits from reduced training and operations costs.

While the preferred embodiment of the present invention has been described and illustrated, it will be apparent to persons skilled in the art that numerous modifications and variations are possible. The scope of the invention, therefore, is only to be limited by the claims appended hereto.

We claim:

1. A processor-implemented method for building a sub-network within a main network, comprising the steps of:
   (a) maintaining current configuration information on the main network;
   (b) receiving a set of high-level requirements to be met by the sub-network;
   (c) translating said set of high-level requirements into a corresponding set of low-level requirements;
   (d) in response to user input, generating at least one option, each option corresponding to a detailed technical specification for configuring the main network such that the set of low-level requirements is met;
   (e) providing a first graphical selection mechanism for allowing the user to select an option;
   (f) in response to the user selecting an option through the first graphical selection mechanism, converting the detailed technical specification corresponding to the selected option into a set of graphical elements;
   (g) displaying said set of graphical elements as a logical view of the main network configured in accordance with the selected option;
   (h) causing resources in the main network to be automatically provisioned to meet said set of high-level requirements.

2. A method as claimed in claim 1, wherein the graphical elements are chosen from a symbol dictionary.

3. A method as claimed in claim 1, further comprising, between the step of displaying and step (c), the step of:
   providing a second graphical selection mechanism for allowing the user to proceed to step (c).

4. A method as claimed in claim 1, further comprising, between the step of displaying and step (c), the step of:
   providing a second graphical selection mechanism for allowing the user to choose between proceeding to step (c) or modifying the selected option.

5. A method as claimed in claim 4, further comprising, between the step of providing a second graphical interface and step (c), the steps of:
   accepting user-generated reductions in the high-level requirements corresponding to the selected option;
   modifying the detailed technical specification corresponding to the selected option in accordance with said reductions;
   converting the modified detailed technical specification into a modified set of graphical elements; and
   displaying said set of modified graphical elements as a modified logical view of the main network.

6. A method as claimed in claim 1, wherein the main network comprises the Internet.

7. A method as claimed in claim 1, wherein the main network comprises the public switched telephone network.

8. A network management system adapted to implement the method of claim 1.

9. A computer-readable storage medium having software stored thereon, for instructing a processor to implement a method of building a sub-network within a main network, the method comprising the steps of:

(a) maintaining current configuration information on the main network;

(b) receiving a set of high-level requirements to be met by the sub-network;

(c) translating said set of high-level requirements into a corresponding set of low-level requirements;

(d) in response to user input, generating at least one option, each option corresponding to a detailed technical specification for configuring the main network such that the set of low-level requirements is met;

(e) providing a first graphical selection mechanism for allowing the user to select an option;

(f) in response to the user selecting an option through the first graphical selection mechanism, converting the detailed technical specification corresponding to the selected option into a set of graphical elements;

(g) displaying said set of graphical elements as a logical view of the main network configured in accordance with the selected option;

(h) causing resources in the main network to be automatically provisioned to meet said set of high-level requirements.

10. A network management system for building a virtual private network (VPN), comprising:

means for maintaining current configuration information on the main network;

means for receiving a set of high-level requirements to be met by the VPN;

means for translating said set of high-level requirements into a corresponding set of low-level requirements;

means for, in response to user input, generating at least one option, each option corresponding to a detailed technical specification for configuring the main network such that the set of low-level requirements is met;

means for providing a first graphical selection mechanism for allowing the user to select an option;

means for, in response to the user selecting an option through the first graphical selection mechanism, converting the detailed technical specification corresponding to the selected option into a set of graphical elements;

means for displaying said set of graphical elements as a logical view of the main network configured in accordance with the selected option;

means for automatically provisioning resources in the main network to accommodate set of high-level requirements.

11. A processor-implemented graphical user interface (GUI) method for assisting a user in building a virtual private network (VPN), comprising:

providing a first interactive graphical mechanism for allowing the user to enter high-level requirements associated with each of a plurality of customer sites;

providing a second interactive graphical mechanism for allowing the user to request the generation of at least one option for configuring a main network in accordance with said high-level requirements;

in response to a user input requesting the generation of at least one option, providing a third interactive graphical mechanism for allowing the user to select one of the generated options;

in response to a user input selecting an option, displaying a logical view of the VPN in accordance with the selected option; and providing a fourth interactive graphical mechanism for allowing the user to commit the selected configuration option to a network management system.

12. A GUI method as claimed in claim 11, wherein the first interactive graphical mechanism comprises a working area and a palette, the palette comprising a set of icons, wherein customer sites can be positioned in the working area and service types required at each customer site can be selected by accessing icons in the palette.

13. A GUI method as claimed in claim 12, wherein selecting a service type required at a customer site triggers the appearance of a service options window through which the user selects a desired quality of the selected service type.

14. A GUI method as claimed in claim 12, wherein selecting a service type required at a customer site triggers the appearance of a service options window through which the user selects a desired bandwidth of the selected service type.

15. A GUI method as claimed in claim 11, wherein selecting a service type required at a customer site triggers the appearance of a service options window through which the user selects a desired degree of featurization of the selected service type.

16. A GUI method as claimed in claim 11, wherein the second interactive graphical mechanism comprises a button, tab, palette or menu item.

17. A GUI method as claimed in claim 11, further comprising:

in response to the user accessing the first interactive graphical mechanism, prompting the user to enter a maximum number of options to be generated.

18. A GUI method as claimed in claim 11, wherein the third interactive graphical mechanism comprises a set of buttons, tabs, palettes or menu items, each button, tab, palette or menu item corresponding to a respective one of the options.

19. A GUI method as claimed in claim 11, wherein said logical view comprises a plurality of icons depicting the customer sites and the interconnections among the customer sites.

20. A GUI method as claimed in claim 11, wherein said fourth interactive graphical mechanism comprises a button, tab, palette or menu item.

21. A GUI method as claimed in claim 11, further comprising:

providing a fifth interactive graphical mechanism for allowing the user to view a cost breakdown of the selected configuration option.

22. A GUI method as claimed in claim 21, wherein the fifth interactive graphical mechanism comprises a window for displaying said cost breakdown on a per-site basis.

23. A GUI method as claimed in claim 21, wherein the fifth interactive graphical mechanism comprises a window for displaying said cost breakdown on a per-service basis.

24. A GUI method as claimed in claim 21, wherein said logical view and said fifth interactive graphical mechanism are adapted to accept user-generated reductions to said high-level requirements and to reflect said reductions in the logical view of the VPN.

25. A computer-readable storage medium having software stored thereon, for instructing a processor to implement the method of claim 11.

* * * * *

UNITED STATES PATENT AND TRADEMARK OFFICE
CERTIFICATE OF CORRECTION

PATENT NO. : 6,577,327 B1
DATED : June 10, 2003
INVENTOR(S) : Rochford et al.

It is certified that error appears in the above-identified patent and that said Letters Patent is hereby corrected as shown below:

Column 14,
Line 26, claims 15 is dependent on claim 12 rather than on claim 11.

Signed and Sealed this

Thirteenth Day of January, 2004

JON W. DUDAS
*Acting Director of the United States Patent and Trademark Office*